United States Patent
Müller

(10) Patent No.: US 9,782,853 B2
(45) Date of Patent: Oct. 10, 2017

(54) GAS DIFFUSION ELECTRODE

(71) Applicant: MeliCon GmbH, Hückelhoven (DE)

(72) Inventor: Ulrich Müller, Hückelhoven (DE)

(73) Assignee: MeliCon GmbH, Hückelhoven (DE)

( * ) Notice: Subject to any disclaimer, the term of this patent is extended or adjusted under 35 U.S.C. 154(b) by 85 days.

(21) Appl. No.: 14/821,699

(22) Filed: Aug. 8, 2015

(65) Prior Publication Data

US 2016/0049677 A1      Feb. 18, 2016

(30) Foreign Application Priority Data

Aug. 14, 2014  (EP) .................... 14181052

(51) Int. Cl.

| | |
|---|---|
| H01M 4/64 | (2006.01) |
| B23K 11/00 | (2006.01) |
| B22F 3/00 | (2006.01) |
| C25B 11/00 | (2006.01) |
| C25B 11/03 | (2006.01) |
| H01M 8/0232 | (2016.01) |
| H01M 8/0245 | (2016.01) |
| B32B 7/00 | (2006.01) |
| B32B 15/04 | (2006.01) |
| B23K 35/00 | (2006.01) |
| B23K 35/02 | (2006.01) |
| H01M 4/86 | (2006.01) |
| B23K 11/11 | (2006.01) |
| C25B 1/10 | (2006.01) |

(52) U.S. Cl.
CPC .......... *B23K 11/0026* (2013.01); *B22F 3/002* (2013.01); *B23K 11/11* (2013.01); *B23K 35/00* (2013.01); *B23K 35/0205* (2013.01); *B23K 35/0255* (2013.01); *B23K 35/0261* (2013.01); *B32B 7/005* (2013.01); *B32B 15/043* (2013.01); *C25B 1/10* (2013.01); *C25B 11/00* (2013.01); *C25B 11/035* (2013.01); *H01M 4/861* (2013.01); *H01M 8/0232* (2013.01); *H01M 8/0245* (2013.01); *B32B 2307/734* (2013.01)

(58) Field of Classification Search
CPC ....................................................... H01M 4/64
See application file for complete search history.

(56) References Cited

U.S. PATENT DOCUMENTS

| | | |
|---|---|---|
| 3,907,513 A | 9/1975 | Sheinberg |
| 5,804,055 A | 9/1998 | Coin et al. |
| (Continued) | | |

*Primary Examiner* — Jacob Marks
(74) *Attorney, Agent, or Firm* — Gudrun E. Huckett

(57) ABSTRACT

A gas diffusion electrode for a membrane electrode assembly is provided with expanded metal layers each having a mesh configuration defining a length orientation of the expanded metal layers. The expanded metal layers each have opposed flat sides and are stacked in a layered arrangement such that the flat sides of the expanded metal layers that are neighboring each other in the layered arrangement are facing each other as facing flat sides, respectively. The facing flat sides are connected to each other by pulsed resistance welding at welded contact points. Due to the mesh configuration, the welded contact points are distributed evenly across the entire surface area of the facing flat sides. At least one of the expanded metal layers is oriented with its length orientation so as to be rotated by 90° relative to the length orientation of one of the neighboring expanded metal layers.

19 Claims, 4 Drawing Sheets

(56) References Cited

U.S. PATENT DOCUMENTS

| | | |
|---|---|---|
| 6,071,386 A | 6/2000 | Puthawala |
| 8,067,097 B2 | 11/2011 | Mueller |
| 2003/0162081 A1 | 8/2003 | Gestermann et al. |
| 2006/0014451 A1 | 1/2006 | Muller |
| 2008/0131745 A1* | 6/2008 | Ikeda ................ H01M 8/04164 429/413 |
| 2008/0245662 A1 | 10/2008 | Forster et al. |

* cited by examiner

GAS DIFFUSION ELECTRODE

BACKGROUND OF THE INVENTION

The invention relates to a gas diffusion electrode (GDE), also known gas diffusion layer (GDL), namely for a membrane electrode assembly (MEA), comprising a membrane and a gas diffusion electrode contacting the membrane, of a fuel cell, in particular a hydrogen oxygen fuel cell, or of an electrolysis device, in particular an electrolysis device for electrolysis of water. Moreover, the invention concerns a method for producing a gas diffusion electrode.

Gas diffusion electrodes are generally known in the prior art. They are used in performing electrochemical processes, for example, in fuel cells or in electrolysis devices that are embodied as membrane electrolyzer.

US 2003/0162081 A1 discloses a gas diffusion electrode that is comprised of an electrically conducting catalyst support and an electric connector, wherein the catalyst support serves for receiving the catalyst material. As a catalyst support, a fabric, nonwoven, foam or felt of electrically conducting material, an expanded metal plate or a metal plate provided with a plurality of openings is employed onto which the catalyst material is applied. In this context, for forming a dimensionally stable gas diffusion electrode, the catalyst support is fixedly connected mechanically and electrically conductingly with a gas-permeable metallic base plate, in particular made of nickel or its alloys, by sintering. An advantage of this configuration is that, despite the open structure of the catalyst support for receiving the catalyst material, a comparatively shape-stable gas diffusion electrode is provided which is achieved by the comparatively stiff substructure of the base plate which takes on the function of an abutment when pressing the catalyst material into it.

US 2008/0245662 A1 discloses an electrolytic cell and, for providing an electrode with great specific surface area, proposes to configure the cathodes and/or anodes as multilayer expanded metal electrodes which are comprised of at least two expanded metal layers and of an edge electrode that are contacting each other by means of internal resistance zones. The expanded metal layers each are positioned on a base plate and are arranged in a cell trough or in several electrode frames clamped to each other. For further enlargement of the specific electrode surface area, porous intermediate layers are preferably arranged between the expanded metal layers.

U.S. Pat. No. 6,071,386 discloses also an electrolysis apparatus which comprises a plurality of membrane electrolysis cells each provided with a membrane that is provided on both sides with a contact layer. On each of the contact layers a contact plate is arranged so that the electrolysis apparatus, while having a compact configuration, is also suitable for comparatively high hydrogen production rates and is thus usable in a particularly flexible way. Each contact plate is provided with a channel system for transport of water and/or gas on its surface that is facing the associated contact layer.

U.S. Pat. No. 5,804,055 discloses an electrode for an electrochemical cell. In this context, the electrode is a porous multi-layer electrode which is provided with a flexible strip-shaped element that is wound about a central core which is in general of a flat configuration. Each layer of the electrode can be formed of a very thin, highly flexible metal mesh.

U.S. Pat. No. 3,907,513 discloses a composite material with predetermined porosity. The composite material comprises a plurality of screens which are bonded to each other in parallel arrangement. In this context, into the meshes of each screen, spherical particles are inserted that have a diameter substantially reducing the size of the mesh openings.

US 2006/0014451 A1 discloses a method for producing a porous plate-shaped metal composite. The metal composite is produced from metal fibers which are compressed and welded or fused to each other in one working step.

U.S. Pat. No. 8,067,097 B2 discloses a woven laminate as a liner for sound absorption of inlet and outlet sound absorbers. The laminate comprises at least three stacked woven layers that are at least partially fused to each other. One layer has a coarse structure compared to the others, another a fine structure, and the remaining woven layer has a structure between coarse and fine. The woven layers are composed of metallic wires that are interwoven or are intertwined to a nonwoven metallic wires Even though fuel cells and electrolysis devices as well as the gas diffusion electrodes that are used therein are known in numerous configurations, there is still a need for improvement. It is therefore the object of the invention to propose a novel gas diffusion electrode that, due to its constructive configuration, can be used flexibly and provides great versatility.

SUMMARY OF THE INVENTION

As a solution to this object, the invention proposes a gas diffusion electrode with a plurality of layered expanded metal layers wherein neighboring expanded metal layers are connected to each other at contact points of their facing flat sides by pulsed resistance welding, wherein the contact points, as a result of the mesh configuration of the expanded metal layers, are distributed evenly across the entire facing flat sides of the expanded metal layers, and wherein at least one of the expanded metal layers is rotated with regard to its length orientation by 90° relative to its neighboring expanded metal layers.

The gas diffusion electrode according to the invention comprises a plurality of layered expanded metal layers forming a layered arrangement. In this context, "expanded metal" means a metal plate that is provided with openings in the surface wherein the openings, also referred to as meshes, are created by producing staggered cuts in the metal plate without causing material loss and by simultaneously deforming the metal plate by stretching (expanding). Several layers of expanded metal form the gas diffusion electrode according to the invention, wherein neighboring expanded metal layers are welded to each other, respectively. In this way, a dimensionally stable composite of a plurality of expanded metal layers is provided, wherein, in accordance with the future use of the gas diffusion electrode, the composite comprises four, five, six or even more expanded metal layers.

The expanded metal layers which are connected to each other by welding form in an advantageous way a smooth, flat, and stable support for the proton-conducting membrane of the membrane electrode assembly. In the final mounted state of the membrane electrode assembly, this membrane is positioned between two gas diffusion electrodes wherein, for example, in case of water electrolysis, one of the two gas diffusion electrodes is made of titanium (oxygen side) and the other gas diffusion electrode is made of stainless steel (hydrogen side).

According to the invention, neighboring expanded metal layers are areally connected to each other at contact points of their facing flat sides by means of pulsed resistance welding. Due to the mesh configuration of the expanded metal layers, the term "areally connected" in the context of the invention does not mean a complete bonding across the entire surface area. In the context of a flat areal configuration of the expanded metal layers, a connection of the facing flat sides of the two neighboring expanded metal layers is provided at the contact points and, as a result of the mesh configuration of the expanded metal layers, this connection extends evenly across the entire surface area of the facing flat sides of the expanded metal layers. Accordingly, no simple point-shaped (punctual) connection is achieved but instead a connection that is insofar areal that, due to an evenly distributed configuration, numerous contact points are formed across the entire surface area of the flat sides, contacting each other, of the neighboring expanded metal layers. Accordingly, in an advantageous manner a very dimensionally stable composite of the expanded metal layers is provided.

The individual expanded metal layers comprise as a result of their manufacture a plastically deformed height that is greater than the sheet metal thickness of the metal sheets that are selected as a starting material. This plastically deformed height (thickness) imparts to the expanded metal certain springy properties which are advantageously maintained upon connecting the expanded metal layers to each other by means of pulsed resistance welding. The expanded material layers joined by welding to a final composite thus have defined springy properties and, based on the spring characteristics of the individual expanded metal layers, the spring properties can be calculated and can thus be reproducibly produced. It is therefore advantageously possible, as a result of the constructive configuration in accordance with the invention, to influence in a targeted fashion the future contact force between the gas diffusion electrode, on the one hand, and the membrane contacting it, on the other hand, with the goal of ensuring a permanent and reliable contacting of the membrane on the associated gas diffusion electrode or electrodes across the entire surface area. In comparison to connecting by sintering as is known in the prior art, the connection by means of pulsed resistance welding has moreover the advantage that the expanded metal layer composites can be produced with a defined thickness, i.e., with a minimal tolerance dimension, for example, a tolerance dimension of +/−0.5 mm, preferably of +/−0.3 mm, even more preferred of +/−0.05 mm. Such a minimal tolerance value is advantageous particularly in case of contacting of several membrane electrode assemblies to a complete cell because the settling effects that have a negative effect on membrane contacting are minimized.

In fuel cells as well as in electrolysis devices, a plurality of individual membrane electrode assemblies are contacted in series within a so-called stack and form in this way a membrane electrolysis cell. Due to the springy properties of the individual gas diffusion electrodes, certain settling effects of the membrane electrode assemblies that are clamped together to form a stack cannot be avoided. However, in case these settling effects surpass a certain limit, a full-surface contact of the individual membranes on the associated gas diffusion electrodes required for proper operation is no longer guaranteed. Welding together the individual expanded metal layers of a gas diffusion electrode in accordance with the invention provides relief in this context because welding by means of pulsed resistance welding provides the aforementioned advantage of a minimal tolerance value so that undesired settling effects are avoided; this enables advantageously a permanent reliable use of the membrane electrode assemblies furnished with the gas diffusion electrodes according to the invention, even in a stack composite.

Connecting the individual expanded metal layers by means of pulsed resistance welding has the further advantage, particularly in comparison to connecting by sintering, that almost any geometric dimensions can be produced, even continuously, since one is independent of the size of sinter furnaces. For example, the configuration according to the invention enables a manufacture such that the individual expanded metal layers are stacked on top of each other and then welded to each other. The thus formed composite can then be cut to size, tailored and/or portioned, for example, by means of laser cutting, for forming individual gas diffusion electrodes. In this context, pulsed resistance welding compared to sintering is also advantageous because it is energetically less demanding and thus more cost efficient in regard to its use, in particular in case of production of large quantities. A further advantage resides in that stress relief annealing that occurs during sintering does not happen when using pulsed resistance welding. Accordingly, the linear-elastic range, i.e., the straight line in accordance with Hooke's Law, is not impaired and remains completely intact. The expanded metal composite, in contrast to a sintered composite, thus exhibits reproducible spring properties. The gas diffusion electrode exhibits a linear-elastic behavior in the direction of thickness of the layer arrangement.

At least one of the expanded metal layers is rotated in regard to its length orientation by 90° relative to one of its neighboring expanded metal layers. It is thus provided that at least two neighboring expanded metal layers of the future expanded metal layer composite are not congruent but are oriented in rotated arrangement, preferably rotated by 90°, relative to each other. Preferably, even all of the neighboring expanded metal layers are rotated by 90° relative to each other, respectively, which means that a second expanded metal layer following in the direction of thickness a first expanded metal layer is oriented with regard to its length orientation in 90° rotation relative to the second expanded metal layer.

This rotated arrangement in accordance with the invention of the expanded metal layers provides in particular the advantage that, in the intended proper use, the generation of a laminar flow of the fluid that is passing the membrane electrode assembly is avoided. Due to the rotated arrangement of the expanded metal layers, a turbulent flow is achieved instead which, on the one hand, leads to a uniform fluid distribution within the membrane electrode assembly as well as to a complete penetration of the membrane electrode assembly, on the other hand. Accordingly, a higher efficiency of the fuel cell or of the electrolysis device is achieved.

The rotated arrangement of the expanded metal layer in combination with the feature that neighboring expanded metal layers are welded to each other provides also the synergetic effect that a dimensionally stable complete composite is provided and, simultaneously, a minimal tolerance value in the thickness direction exits. Accordingly, the rotated arrangement of neighboring expanded metal layers has the effect that the contact points that are formed between two facing flat sides of neighboring expanded metal layers, respectively, are not congruent to those contact points that are formed between the two facing flat sides of the next neighboring layers. In this way, in the direction of thickness of the composite, a staggered configuration of the individual contact points results so that, as a whole, a very dimensionally stable composite is provided that is imparted across the entire composite surface area with defined spring properties. The staggered orientation of the individual expanded metal layers has moreover the advantage that possible manufacturing-related thickness tolerances of the individual expanded metal layers are compensated. Therefore, a uniform thickness of the complete composite across the entire surface area is ensured.

According to a further feature of the invention, it is provided that some of the expanded metal layers have meshes with different mesh width, respectively. For each expanded metal layer a defined mesh width is provided. This mesh width can vary from expanded metal layer to the next expanded metal layer. This configuration is particularly advantageous in regard to two aspects. A first aspect is that the turbulent fluid flow that should preferably be achieved in a proper situation of use is enhanced in this way. Moreover, a non-uniform distribution of the contact points which are formed between the individual expanded metal layers is provided which additionally enhances the dimensional stability of the future composite.

According to a further feature of the invention, it is provided that the meshes of the expanded metal layer that is contacting the membrane of the membrane electrode assembly has the smallest defined mesh width. According to the invention, it is thus provided that the membrane-contacting expanded metal layer, which is in contact with the membrane of the membrane electrode assembly in the proper situation of use, comprises an expanded metal that is as fine-meshed as possible. Accordingly, a surface that is as smooth as possible but still porous is advantageously made available to the contacting membrane.

According to a further feature, it is proposed in this context that the mesh width of the meshes of the expanded metal layers in the direction of layer thickness decreases in a direction toward the expanded metal layer which is contacting the membrane of the membrane electrode assembly. Accordingly, in the layers that are remote from the membrane, coarser expanded metals are used, wherein the mesh width decreases in the direction toward the membrane, i.e., coarser expanded metals are followed by finer expanded metals in the direction toward the membrane. The object of the coarser expanded metals is in this context to form, on the one hand, a stable and flat surface and, on the other hand, to provide also a certain spring action. This spring action is produced by select expanded metal combinations and can be varied within a wide ranges. Accordingly, in a targeted fashion, the spring characteristic of the future expanded metal layer composite, i.e., the gas diffusion electrode, can be influenced. In this context, the spring action which originates from the future expanded metal layer composite is decisive for ensuring reliable contacting of the membranes in the future situation of use in the associated gas diffusion electrodes. In this context, the configuration according to the invention provides as a result of its construction that this spring action can be adjusted very precisely, for which reason the gas diffusion electrodes according to the invention are suitable in particular also for high pressure applications, for example, for pressures of above 30 bar, 40 bar, 50 bar, and more.

According to a further feature of the invention, a further (second) expanded metal layer is provided that is connected to the expanded metal layer that is opposite the expanded metal layer which is contacting the membrane of the membrane electrode assembly. Accordingly, a further (second) expanded metal layer is used which in the final mounted state of the expanded metal layer is embodied opposite the stretched metal layer which in the proper situation of use is resting on the membrane of the membrane electrode assembly. This further (second) expanded metal layer can be formed of a particularly coarse expanded metal and serves preferably for providing a precisely defined spring force. In this context, it is also provided additionally that the second expanded metal layer is spot-welded to its neighboring expanded metal layer; this means that, in contrast to the other (first) expanded metal layers, it is not areally connected (as defined above) to the neighboring expanded metal layer. Due to this spot-welded configuration, it is ensured that the spring properties provided by the further (second) expanded metal layer are also available in the future expanded metal layer composite. An areally connected weld connection would lead to minimization of the spring properties provided by this further (second) expanded metal layer. Thus, the goal of providing the further (second) expanded metal layer does not reside in stabilizing additionally the expanded metal layer composite but instead in providing sort of a clamping means that, in particular in case of a high pressure application, ensures that the gas diffusion electrodes of the individual membrane electrode assemblies combined with each other to a stack are resting permanently flat on their associated membranes so that a reliable use simultaneous with high efficiency is ensured.

As a solution to the aforementioned object, the invention moreover proposes to provide a method for producing a gas diffusion electrode for a membrane electrode assembly of a fuel cell, in particular of a hydrogen-oxygen fuel cell, or an electrolysis device, in particular an electrolysis device for water electrolysis, in which several expanded metal layers are stacked or layered to form a layered arrangement; in which one of the expanded metal layers in regard to its length orientation is rotated by 90° relative to one of its neighboring expanded metal layers; in which the expanded metal layers in one working step are compressed and welded to each other, wherein welding is realized by means of pulsed resistance welding by using flat (areal) welding electrodes; in which neighboring expanded metal layers at contact points of their facing flat sides are connected to each other, wherein the contact points, as a result of the mesh configuration of the expanded metal layers, are evenly distributed across the entire facing flat sides of the expanded metal layers.

According to the method of the present invention, in a first method step first the individual expanded metal layers are stacked on each other in a layered arrangement. In this context, at least one of the expanded metal layers is rotated in regard to its length orientation by 90° relative to one of the neighboring expanded metal layers. Preferably, in thickness direction of the layered arrangement, the expanded metal layers each are displaced by 90° with respect to their length orientation relative to each other, which means that a lengthwise oriented expanded metal layer is followed by a transversely oriented expanded metal layer and a transversely oriented expanded metal layer is followed by a lengthwise oriented expanded metal layer. The thus oriented positioning of the expanded metal layers provides the aforementioned advantages.

After arranging the expanded metal layers in a layered arrangement, they are welded to each other, wherein the expanded metal layers in one working step are compressed and connected to each other by welding. The simultaneous pressing and welding action has the advantage that a defined thickness geometry can be achieved while at the same time a minimal tolerance value is achieved. In this context, welding is done by means of pulsed resistance welding by using flat (areal) welding electrodes. The use of flat or areal welding electrodes is advantageous in that across the entire surface area a uniform compression force can be applied wherein, on the one hand, the formation of appropriate contact points with regard to quantity and size between the facing flat sides of neighboring expanded metal layers as well as, on the other hand, a uniform thickness configuration in width orientation and length orientation are ensured.

According to a special proposal of the invention, it is provided that the expanded metal layers between the flat (areal) welding electrodes are compressed with a compression force that is sufficient for the welding process while at the same time the compression force is low enough to avoid plastic deformation. The compression force which is to be applied by the flat (areal) welding electrodes must be so great, on the one hand, that the contact points are formed between the facing flat sides of neighboring expanded metal layers for producing a proper weld. In particular in case of a compression force that is too small, these contact points are not formed or formed only to an insufficient degree so that no proper weld connection of the individual expanded metal layers can be achieved. When the compression force is too small, no complete areal contact of the welding electrodes on the outer expanded metal layers is achieved moreover; this can lead to formation of electric arcs which must be avoided at all cost because, in the case of an electric arc being generated, material destruction at the arc location will occur.

The applied compression force however must not be too great because then plastic deformation of the expanded metal layers will occur; in case of plastic deformation, the spring force of the expanded metal layers that is to be necessarily applied in the proper situation of use is then no longer ensured. In this context, such a plastic deformation occurs already at relatively small excessive compression forces due to the manufacture-related height differences between plastically deformed height and sheet metal height of the starting material which must be taken into account for expanded metals. The compression force is therefore to be selected such that a full-surface contact of the welding electrodes on the outer expanded metal layers is ensured, that a sufficiently large number of contact points between neighboring expanded metal layers are formed, and that plastic deformations of the expanded metal layers are avoided. In this context, the compression force can be varied as a function of the employed welding energy.

By means of the welding electrodes, preferably a compression force is generated of 1.0 N/mm² to 3.5 N/mm², preferably of 1.3 N/mm² to 3.0 N/mm², more preferred of 1.5 N/mm² to 2.8 N/mm², most preferred of 1.7 N/mm² to 2.5 N/mm².

Moreover, the invention proposes that by means of the welding electrodes a welding energy is generated of 1.0 J/mm² to 3.0 J/mm², preferably of 1.2 J/mm² to 2.6 J/mm², even more preferred of 1.4 J/mm² up to 2.4 J/mm², and most preferred of 1.6 J/mm² to 2.2 J/mm².

According to a further feature of the invention, it is provided that a further (second) expanded metal layer is connected to the composite which is comprised of several expanded metal layers. This further (second) expanded metal layer is comprised preferably of a coarser expanded metal and is applied to the side of the expanded metal composite which is remote from the membrane, i.e., to the membrane-remote expanded metal layer. In this context, this further (second) expanded metal layer serves primarily the purpose of providing an appropriate spring force, which leads to the aforementioned advantages.

In this context, it is moreover provided in regard to the method that the further (second) expanded metal layer is connected by means of resistance spot welding to the expanded metal composite. Therefore, no areally connected connection is formed but only a spot-wise connection so that the spring force which is provided by the further (second) expanded metal layer is available in the proper situation of use.

BRIEF DESCRIPTION OF THE DRAWING

Further features and advantages of the invention result from the following description with the aid of the drawings. In this context, the figures show purely schematic illustrations.

DESCRIPTION OF THE PREFERRED EMBODIMENTS

Figure 1:
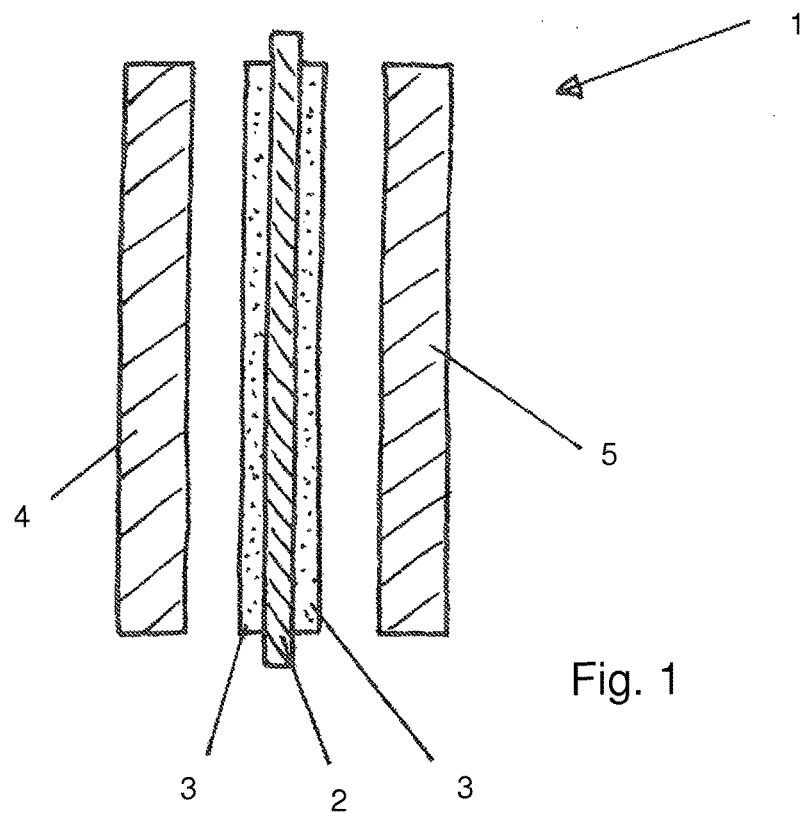
FIG. 1 is an exploded view of a membrane electrode assembly.

FIG. 1 shows in a purely schematic illustration a membrane electrode assembly 1 (MEA for short). In the illustrated embodiment, the membrane electrode assembly 1 comprises a membrane 2 which is provided on both sides with a catalyst layer 3. Neighboring these catalyst layers 3, a first gas diffusion electrode 4 and a second gas diffusion electrode 5 are provided, respectively. In this context, the gas diffusion electrode 4 can form the anode side, for example, and the gas diffusion electrode 5 the cathode side.

Figure 2:
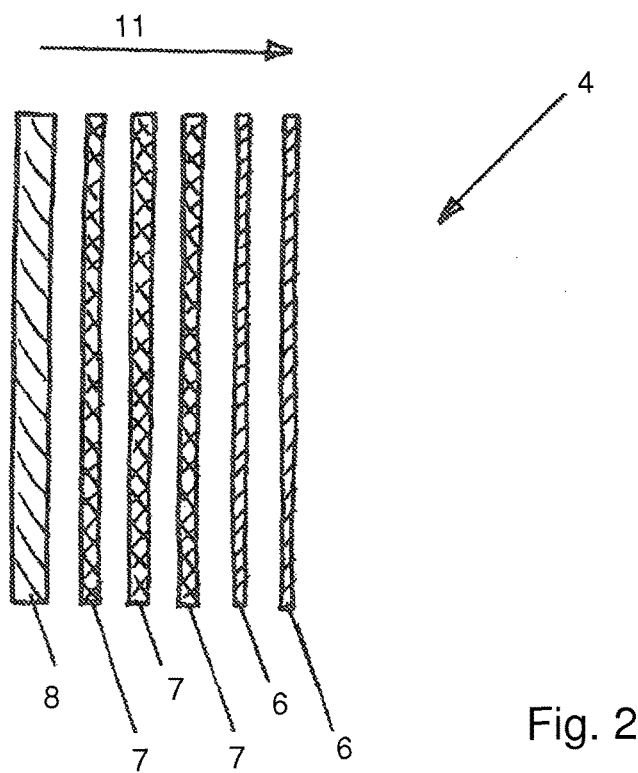
FIG. 2 is an exploded view of a gas diffusion electrode.

According to the invention, the gas diffusion electrodes 4, 5 are comprised of individual expanded metal layers 6, 7, 8 that are welded to each other, as is shown in an exemplary fashion with the aid of the gas diffusion electrode 4 in FIG. 2.

As shown in FIG. 2, the gas diffusion electrode 4 in the illustrated embodiment comprises a total of six first expanded metal layers wherein expanded metal layers with differently sized meshes are provided. Two first expanded metal layers 6 with comparatively small mesh width, three expanded metal layers 7 with larger mesh width as well as an expanded metal layer 8 with a comparatively coarse mesh width are provided. In this context, the mesh width decreases from coarse to fine in the direction of arrow 11, i.e., with reference to the illustration of FIG. 1, in the direction toward the membrane 2 contacting the gas diffusion electrode 4, 5 in the final mounted state.

Figure 3:
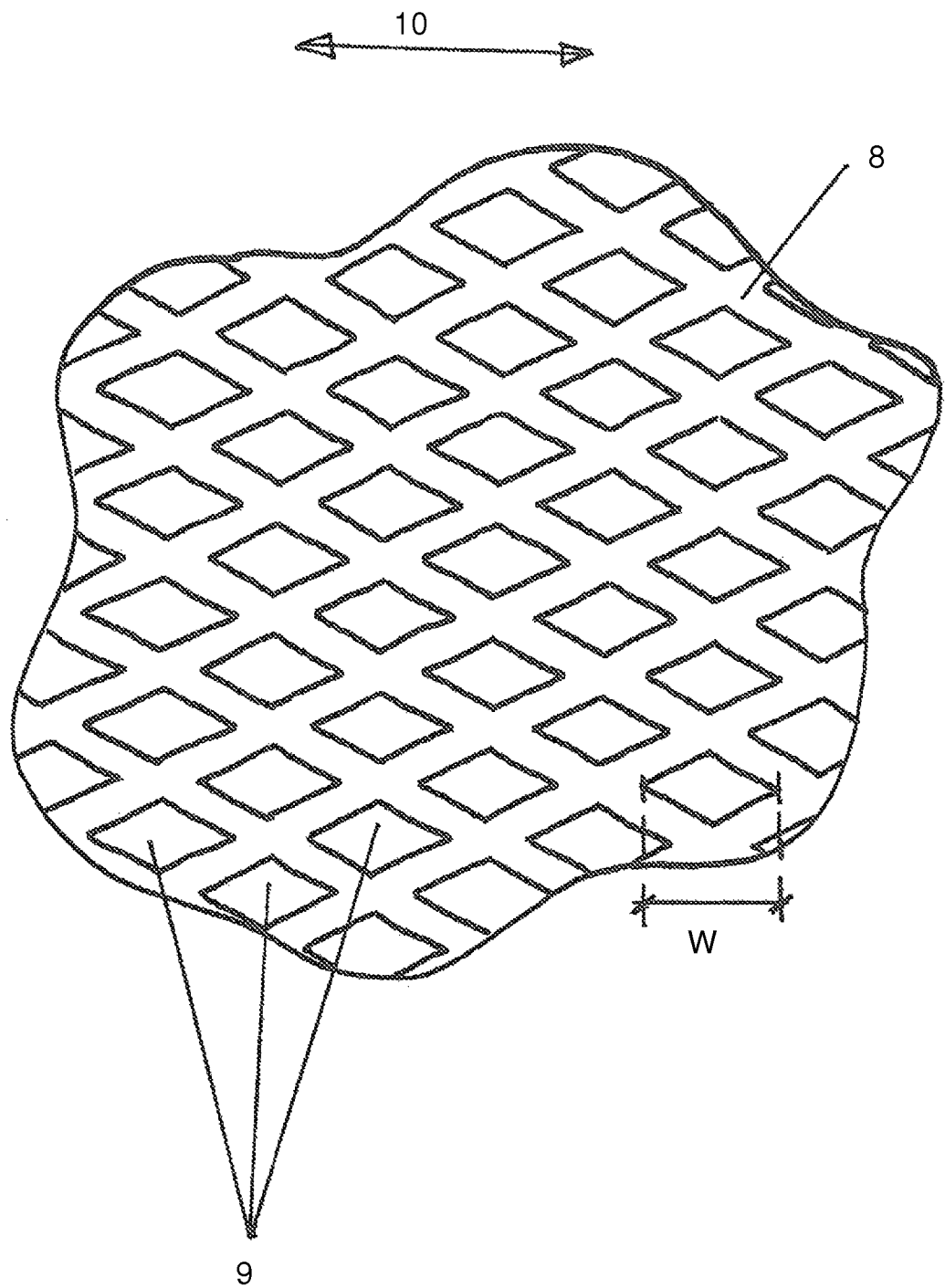
FIG. 3 is a detail view an expanded metal layer.

FIG. 3 shows a detail view of the expanded metal layer 8. As can be seen in the illustration, the expanded metal layer 8 comprises a plurality of diamond-shaped meshes 9 which each have a mesh width W. In this context, the length orientation 10 of the expanded metal layer 8 is oriented in the direction of the mesh width W that determines the mesh size.

According to the invention, it is provided that the individual expanded metal layers of the gas diffusion electrode 4, 5 are connected to each other by welding. In this context, at least one of the expanded metal layers 6, 7 and/or 8 is rotated in regard to its length orientation 10 by 90° relative to its neighboring expanded metal layer 6, 7 or 8, i.e., the expanded metal layers are oriented relative to each other in rotated arrangement such that the mesh width of the meshes of the associated expanded metal layers are oriented transversely, preferably rotated by 90°, relative to each other in respective neighboring layers.

The first expanded metal layers 6 and 7 are connected to each other by means of pulsed resistance welding, namely at contact points of their facing flat sides 15, 16. Accordingly, a contact connection between neighboring first expanded metal layers is provided that, as a whole, can be said to be areally connected.

The further (second) expanded metal layer 8 is not areally connected to the composite that is formed of the first expanded metal layers 6 and 7 but only spot-wise, which is achieved by spot welding.

Figure 4:
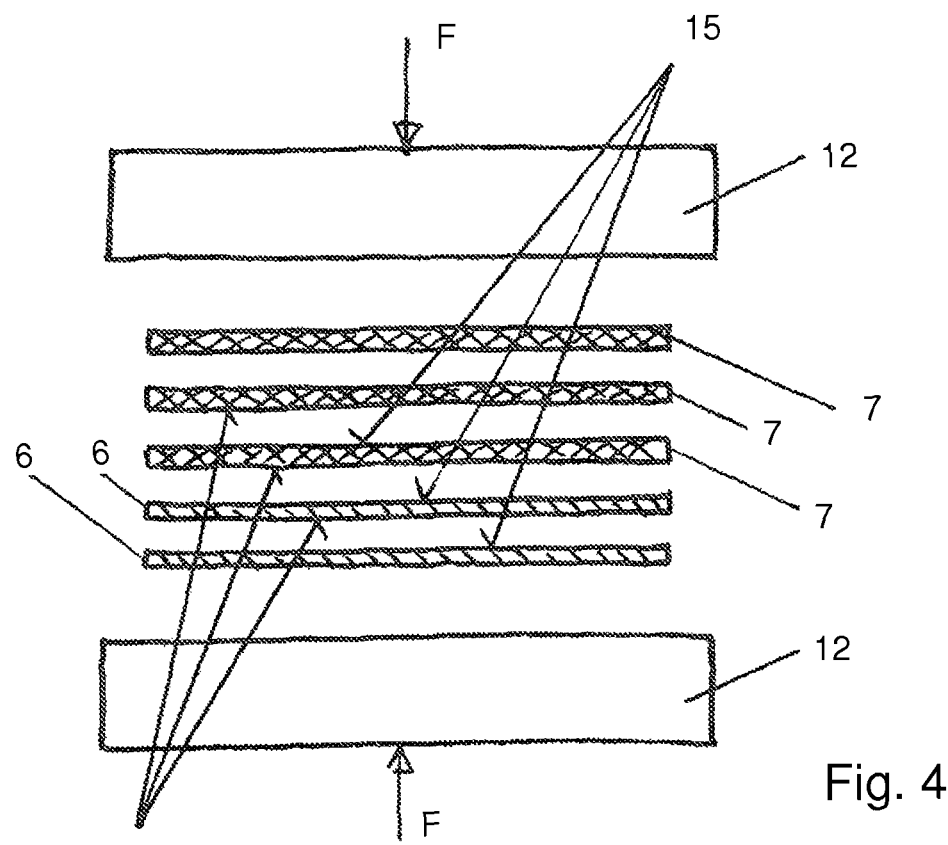
FIG. 4 shows the first step of a method according to the invention.
Figure 5:
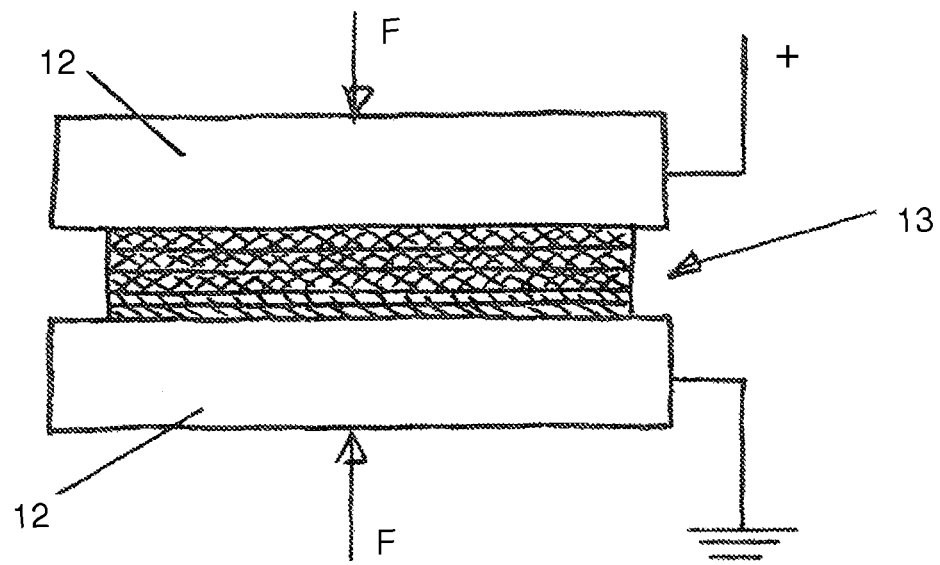
FIG. 5 shows the second step of the method according to the invention.
Figure 6:
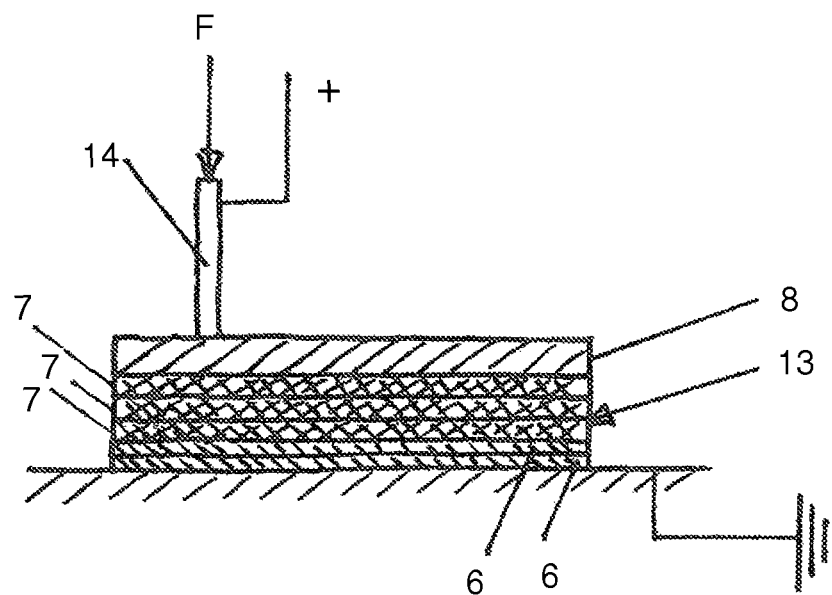
FIG. 6 shows the third step of the method according to the invention.

FIGS. 4, 5 and 6 illustrate the method according to the invention schematically.

For welding the first expanded metal layers 6 and 7 by pulsed resistance welding, welding electrodes 12 of a flat (areal) areal configuration are used. In this context, the expanded metal layers which are to be welded to each other are introduced into the gap between the two welding electrodes 12. Then the two welding electrodes 12 are moved toward each other causing a compression of the first expanded metal layers 6 and 7 arranged between the welding electrodes 12. The movement of the welding electrodes 12 is stopped when the first expanded metal layers 6, 7 have been compressed by a defined force F that is predetermined, for example, by a control unit. In this context, the compression force F is selected in particular based on the geometric configuration and/or the material of the first expanded metal layers 6 and 7 to be connected to each other and can be adjusted as needed.

Onto the first expanded metal layers 6 and 7 which are pressed against each other by the two welding electrodes 12, a welding pulse is applied via the welding electrodes 12, namely for a certain pulse duration at a defined welding energy. The pulse duration is preferably in the range of a few milliseconds, for example, between 5 ms and 100 ms. The welding energy can be, for example, between 1.4 J/mm$^2$ and 2.4 J/mm$^2$.

The first expanded metal layers 6 and 7 that are welded to each other form the joined composite 13. The further or second expanded metal layer 8 is then applied and spot-welded thereto for which purpose a spot-welding electrode 14 is used, as shown in the illustration of FIG. 6. In this way, the connection between the second expanded metal layer 8 and the joined composite 13 is not areally connected, but is formed by individual spot welds.

The specification incorporates by reference the entire disclosure of European priority document 14 181 052.3 having a filing date of Aug. 14, 2014.

While specific embodiments of the invention have been shown and described in detail to illustrate the inventive principles, it will be understood that the invention may be embodied otherwise without departing from such principles.

LIST OF REFERENCE NUMBERS 1 membrane electrode assembly
2 membrane
3 catalyst layer
4 gas diffusion electrode
5 gas diffusion electrode
6 expanded metal layer
7 expanded metal layer
8 expanded metal layer
9 mesh
10 length orientation
11 arrow
12 welding electrode
13 composite
14 spot welding electrode
15 flat side
16 flat side
W mesh width
F compression force

What is claimed is:

1. A gas diffusion electrode for a membrane electrode assembly, the gas diffusion electrode comprising:
   first expanded metal layers each comprising a mesh configuration defining a length orientation of the first expanded metal layers;
   the first expanded metal layers each comprising opposed flat sides;
   the first expanded metal layers stacked in a layered arrangement such that the flat sides of the first expanded metal layers that are neighboring each other in the layered arrangement are facing each other as facing flat sides, respectively;
   the facing flat sides connected to each other by pulsed resistance welding at welded contact points;
   wherein, due to the mesh configuration of the first expanded metal layers, the welded contact points are distributed evenly across the entire surface area of the facing flat sides;
   wherein at least one of the first expanded metal layers is oriented with its length orientation so as to be rotated by 90° relative to the length orientation of one of the neighboring first expanded metal layers.

2. The gas diffusion electrode according to claim 1, wherein the first expanded metal layers each have a defined mesh width, wherein at least two of the first expanded metal layers differ from each other with regard to the defined mesh width.

3. The gas diffusion electrode according to claim 2, wherein the first expanded metal layers include a membrane-contacting expanded metal layer that is configured to contact directly a membrane of a membrane electrode assembly, wherein the mesh width of the membrane-contacting expanded metal layer is the smallest mesh width of the defined mesh widths of the first expanded metal layers.

4. The gas diffusion electrode according to claim 3, wherein the defined mesh widths of the first expanded metal layers decrease in a direction of thickness of the layered arrangement toward the membrane-contacting expanded metal layer.

5. The gas diffusion electrode according to claim 3, further comprising a second expanded metal layer, wherein the first expanded metal layers include a membrane-remote expanded metal layer opposite the membrane-contacting expanded metal layer, wherein the second expanded metal layer is connected to the membrane-remote expanded metal layer.

6. The gas diffusion electrode according to claim 5, wherein the second expanded metal layer is connected to the membrane-remote expanded metal layer by spot welding.

7. The gas diffusion electrode according to claim 1, comprising a linear-elastic behavior in a direction of thickness of the layer arrangement.

8. A method for producing a gas diffusion electrode for a membrane electrode assembly, the method comprising:

stacking first expanded metal layers, each comprising a mesh configuration defining a length orientation of the first expanded metal layers and each comprising opposed flat sides, on top of each other to form a layered arrangement such that at least one of the first expanded metal layers is oriented with its length orientation so as to be rotated by 90° relative to the length orientation of one of the neighboring first expanded metal layers and such that the flat sides of the first expanded metal layers that are neighboring each other in the layered arrangement are facing each other as facing flat sides, respectively;

in one working step with flat welding electrodes compressing the layered arrangement of the first expanded metal layers, and connecting by pulsed resistance welding the neighboring first expanded metal layers to each other at their facing flat sides by welded contact points that are evenly distributed across the entire surface area of the facing flat sides of the first expanded metal layers due to the mesh configuration of the first expanded metal layers.

9. The method according to claim 8, further comprising generating a compression force by the flat welding electrodes, the compression force sufficiently great for welding and low enough to avoid plastic deformation of the first expanded metal layers.

10. The method according to claim 9, wherein the compression force applied by the flat welding electrodes is 1.0 $N/mm^2$ to 3.5 $N/mm^2$.

11. The method according to claim 10, wherein the compression force applied by the flat welding electrodes is 1.3 $N/mm^2$ to 3.0 $N/mm^2$.

12. The method according to claim 11, wherein the compression force applied by the flat welding electrodes is 1.5 $N/mm^2$ to 2.8 $N/mm^2$.

13. The method according to claim 12, wherein the compression force applied by the flat welding electrodes is 1.7 $N/mm^2$ to 2.5 $N/mm^2$.

14. The method according to claim 8, further comprising generating a welding energy by the flat welding electrodes of 1.0 $J/mm^2$ to 3.0 $J/mm^2$.

15. The method according to claim 14, wherein the welding energy is 1.2 $J/mm^2$ to 2.6 $J/mm^2$.

16. The method according to claim 15, wherein the welding energy is 1.4 $J/mm^2$ to 2.4 $J/mm^2$.

17. The method according to claim 15, wherein the welding energy is 1.6 $J/mm^2$ to 2.2 $J/mm^2$.

18. The method according to claim 8, further comprising connecting a second expanded metal layer to the layered arrangement.

19. The method according to claim 18, further comprising connecting the second expanded metal layer by resistance spot welding.

* * * * *